United States Patent Office 2,763,623
Patented Sept. 18, 1956

2,763,623

PREPARATION OF SILICA-ALUMINA CATALYST OF REDUCED CRACKING ACTIVITY

Vladimir Haensel, Hinsdale, Ill., assignor to Universal Oil Products Company, Chicago, Ill., a corporation of Delaware No Drawing. Application May 26, 1951,
Serial No. 228,522

3 Claims. (Cl. 252—455)

This invention relates to a novel catalyst and more particularly to a novel catalyst comprising platinum or palladium composited with a particular type of component.

The component to be composited with the platinum or palladium comprises one originally having hydrocarbon cracking activity but which has been treated to substantially reduce the hydrocarbon cracking activity. For example, silica-alumina is a well known cracking catalyst. However, when composited with platinum or palladium and used for certain purposes, the effect of the silica-alumina is too active in catalyzing cracking reactions. In accordance with the present invention the silica-alumina, or other component having cracking activity, is treated to reduce substantially the cracking activity but to retain some cracking activity. When prepared in this manner, the catalyst may find particular utility for reactions where a small but definite amount of cracking activity is desired but, on the other hand, the cracking activity must not be too excessive. Examples of reactions where such catalysts find utility will be set forth hereinafter in detail.

In one embodiment the present invention relates to a catalyst comprising a metal selected from the group consisting of platinum or palladium composited with a deactivated hydrocarbon cracking component.

In a specific embodiment the present invention relates to a catalyst comprising a metal selected from the group consisting of platinum and palladium composited with a hydrocarbon cracking component, said component having been subjected to treatment to effect deactivation of the cracking activity thereof prior to compositing with said metal.

In another embodiment the present invention relates to a method of manufacturing a catalyst which comprises preparing a composite having hydrocarbon cracking activity, subjecting said composite to treatment to substantially reduce the cracking activity thereof, and thereafter compositing therewith a metal from the group consisting of platinum and palladium in an amount of from about 0.01% to about 2.5% by weight of the final catalyst.

The preferred component having cracking activity comprises silica and alumina, either naturally occurring or synthetically produced. Naturally occurring materials include various aluminum silicates, particularly when acid treated, such as Super Filtrol, etc. The synthetic material may be made in any suitable manner including separate, successive or coprecipitative methods of manufacture. Silica-alumina may be manufactured by commingling an acid such as hydrochloric, sulfuric, etc. with commercial water glass under conditions to precipitate silica, washing with acidulated water or otherwise to remove sodium ions, commingling therewith an aluminum salt such as aluminum chloride, aluminum sulfate, aluminum nitrate, etc., and either adding a basic precipitant, such as ammonium hydroxide, to precipitate alumina, or forming the desired oxide or oxides by thermal decomposition of the salt as the case may permit. The silica-alumina composite may contain from about 20% to about 95% by weight of silica with the remainder comprising alumina, although amounts above and below this range also may be used. The silica-alumina composite may be in the form of regular beads or granules of irregular size and shape. The granules may be ground and formed into pellets of uniform size and shape by pilling, extrusion or other suitable methods.

A particularly satisfactory method of forming the cracking component is to add the acid to commercial water glass at a pH controlled to subsequently form silica hydrogel, discharging the mixture of acid and water glass from a rotating disc or nozzle into a bath of oil of sufficient depth so that the silica hydrogel sets into firm spheres during passage through the oil bath. The spheres may be removed from the bath in any suitable manner, such as by being transported in a stream of water disposed beneath the oil layer. The silica spheres may then be treated in any suitable manner to remove sodium ions, followed by impregnating with a solution of soluble metal salt or salts. In another embodiment silica-alumina spheres may be formed by coprecipitation methods in a similar system.

In accordance with the present invention the silica-alumina or other cracking component is treated in any suitable manner to reduce substantially the cracking activity thereof. In a preferred method the cracking component is subjected to steaming at temperatures of from about 900° to about 1800° F. or more, at steam pressures ranging from atmospheric to 100 pounds per square inch or more for a sufficient time to substantially deactivate the cracking activity thereof. This time may range from about 4 hours to 100 hours, although longer or shorter periods may be used. In general the temperature and time will be correlated to effect the desired deactivation.

In another method of deactivating the cracking activity, the composite may be subjected to heating at a temperature of from about 1500° to about 2000° F. without the use of steam for a sufficient time to obtain the desired deactivation. The time of heating again will be correlated with the temperature and usually will range from about 3 hours to about 75 hours, although longer or shorter periods may be used.

As hereinbefore set forth, it is an essential feature of the present invention that the cracking component be deactivated to reduce the cracking activity thereof to a substantial extent. The cracking activity may be determined in any suitable manner, various methods of evaluating cracking activity having been devised. A preferred method and the method utilized in the present application comprises the cracking of a Mid-Continent gas oil of approximately 30–32° A. P. I. gravity, having an initial boiling point above about 420° F. so that the gas oil contains no gasoline components, and determining the total amount of gas and gasoline produced. The cracking is effected at a temperature of 932° F., atmospheric pressure and a liquid hourly space velocity of 4. The liquid hourly space velocity is defined as the volume of oil per volume of catalyst per hour in the reaction zone. The amount of gas and gasoline produced by cracking in this manner is utilized as the cracking activity criterion. In general, the silica-alumina catalysts being used commercially at the present time will produce gas and gasoline in a weight per cent of above about 20. In accordance with the present invention, the cracking activity is substantially reduced and preferably is of an activity of not above about 15 when measured in the manner herein set forth and may be as low as 10 or lower. As a general criterion which may be used, particularly when the activity is measured by other methods, it may be stated that the activity of the deactivated cracking component should be reduced to below about 75% of the original activity and preferably is reduced to below about 50% thereof.

While the heretofore description has been directed primarily to the use of a cracking component comprising silica and alumina, it is understood that other suitable cracking components may be utilized in accordance with the present invention and may comprise, for example, silica-zirconia, silica-alumina-zirconia, silica-magnesia, silica-alumina-magnesia, silica-thoria, slica-alumina-thoria, alumina-boria, etc.

The final composite catalyst of the present invention may be prepared in any suitable manner, a preferred method comprising admixing chloroplatinic acid or chloropalladium acid in the desired amounts with the cracking component which had been deactivated in the manner hereinbefore set forth. For convenience in manufacture, the chloroplatinic or chloropalladium acid is utilized as an aqueous solution and the silica-alumina component, preferably in the form of particles of definite size and shape, is soaked in the solution of chloroplatinic or chloropalladium acid for a sufficient time and thereafter the mixture is heated to evaporate excess solution. The composite of platinum or palladium with silica and alumina is then dried at a temperature of from about 200° to about 500° F. or more and calcined at a temperature of from about 800° to about 1100° F. In another embodiment, the composite may be treated with hydrogen to reduce the chloride to the metal. It is understood that other suitable methods of preparing the catalyst may be employed.

In a preferred embodiment of the invention, the platinum or palladium is utilized in a concentration of from about 0.01% to about 2.5% by weight of the final catalyst, particularly when the catalyst is to be utilized for the reforming of gasoline fractions to improve the antiknock characteristics thereof. When utilized in reforming operations, concentrations smaller than 0.01% are undesirable since they result in catalysts of too low an activity. On the other hand, concentrations of platinum or palladium in excess of about 2.5% may result in excessive cracking. However, when utilized for other purposes, it is understood that the platinum or palladium concentrations may be above or below the range herein specified but generally will not be in excess of about 10% by weight of the final catalyst.

As hereinbefore set forth, catalysts prepared in the above manner are particularly suitable for the reforming of petroleum distillates including, naphthas, gasoline and kerosene, and particularly gasoline fractions. The gasoline fraction may be a full boiling range gasoline having an initial boiling point within the range of from about 50° to about 90° F. and an end boiling point within the range of from about 375° to about 425° F., or it may be a selected fraction thereof which usually will be a higher boiling fraction, commonly referred to as naphtha and generally having an initial boiling point of from about 150° to about 250° F. and an end boiling point within the range of from about 350° to about 425° F. The petroleum distillates to be reformed are mixtures containing paraffinic hydrocarbons which usually are of straight chain or slightly branched chain structure and naphthenic hydrocarbons, particularly cyclohexane compounds, as well as varying proportions of aromatic hydrocarbons. In order to obtain best results in reforming operations, it is desired to effect maximum dehydrogenation of the naphthenic hydrocarbons to produce aromatics and also to effect isomerization of the paraffinic hydrocarbons to increase the branching thereof and isomerization of the alkyl cyclopentanes to cyclohexane compounds for dehydrogenation to aromatics, as well as to effect a controlled type of cracking which is selective both in quality and quantity. In addition, various other concomitant reactions occur such as dehydrocyclization of the paraffinic hydrocarbons to aromatics, hydrogen transfer reactions, desulfurization, etc.

In order to obtain maximum dehydrogenation and isomerization as hereinbefore set forth, it generally is necessary to employ comparatively high temperatures. On the other hand, the use of high temperatures may result in excessive cracking when utilizing a catalyst containing a component having substantial cracking activity. It is thus seen that the use of the catalyst containing the deactivated cracking component permits the use of high temperatures to obtain the desired dehydrogenation and isomerization but not excessive cracking. The deactivated cracking component, as hereinbefore set forth, contains a small but definite amount of cracking activity and thereby serves to effect the desired effective but controlled cracking. This cracking is desired because the lower molecular weight components have higher octane numbers in general than the higher molecular weight components. Furthermore, this cracking is of particular advantage when the charging stock contains components boiling above about 400° F. in order to convert these components into fractions boiling below 400° F. It is thus seen that the selective cracking results both in an improved quality product and in an increase in quantity of the desired products.

As hereinbefore, set forth, the cracking must be selective and controlled because non-selective or uncontrolled cracking will result in the more rapid formation of larger quantities of coke or carbonaceous material which deposits on the catalyst and decreases or destroys its activity to catalyze the desired reactions. This in turn results in shorter processing cycles or periods, with the necessity of more frequent regeneration of the catalyst by burning the carbonaceous products therefrom or, should the catalyst activity be destroyed, it will be necessary to shut down the unit to remove the old catalyst and replace it with new catalyst.

The reforming generally is effected at a temperature of from about 600° to about 1100° F. and preferably of from about 700° to about 1000° F., at pressures of from about atmospheric to 1000 pounds per square inch or more and preferably of from about 200 to about 800 pounds per square inch. The hourly liquid space velocity generally will be within the range of from about 0.1 to 20 or more and the reforming preferably is effected in the presence of hydrogen in a hydrogen to hydrocarbon molar ratio of from about 0.1:1 to 10:1 or more.

In one manner of operation of the process, sufficient hydrogen will be produced in the reforming reaction to saturate the hydrocarbon fragments formed therein and, therefore, it may be unnecessary either to introduce hydrogen from an extraneous source or to recycle hydrogen within the process. However, it usually will be preferred to introduce hydrogen from an extraneous source, generally at the beginning of the operation, and to recycle hydrogen within the process in order to assure a sufficient hydrogen atmosphere in the reaction zone. Hydrogen serves to reduce carbon formation and thereby to lengthen the life of the catalyst.

After a period of service, it will be necessary to reactivate the catalyst and this may readily be accomplished by passing air or other oxygen-containing gases therethrough in order to burn carbonaceous deposits from the catalyst. A particularly suitable manner of regenerating the catalyst comprises effecting the regeneration at a temperature of about 900° to about 950° F., starting with a gas containing about 2% oxygen and gradually increasing the oxygen concentration so that at the end of the regeneration period pure air is being passed over the catalyst. However, it is important that the temperature of regeneration should not exceed about 1100° F. as it has been found that higher temperatures tend to impair the catalyst activity.

When desired, the petroleum distillate charging stock may be treated to remove undesirable impurities prior to reforming. For example, charging stocks containing sulfur may be subjected to desulfurization prior to reforming. Any suitable desulfurizing catalyst may be employed such as the oxides and/or sulfides of nickel, molybdenum, chromium, etc., or various clays and synthetic silica-alumina composites, etc. A particularly suitable catalyst for use in the desulfurization step of such a combination process comprises silica-alumina-nickel which preferably is employed at a temperature of from about 400° to about 750° F. and at a superatmospheric pressure of from about 50 to about 1000 pounds per square inch.

The process of the present invention may be effected in any suitable equipment. A particularly suitable process comprises the well known fixed bed system in which the catalyst is disposed in a reaction zone and the gasoline is passed therethrough at the proper conditions of operation in either upward or downward flow. The products are fractionated to separate excess hydrogen and to recover the desired gasoline fraction. As hereinbefore set forth, the hydrogen may be recycled for further use in the process. Other suitable units in which the process may be effected include the fluidized type process in which the hydrocarbon and catalyst are maintained in a state of turbulence under hindered settling conditions in the reaction zone, the compact moving bed type process in which the catalyst and hydrocarbon are passed either concurrently or countercurrently to each other, and the suspensoid type operation in which the catalyst is carried as a slurry in the hydrocarbon oil into the reaction zone.

As hereinbefore set forth, the catalyst prepared in this manner is particularly useful for reforming operations. However, it is understood that the catalyst of the present invention may be used in any process for which platinum or palladium is a catalyst, including the treatment of higher boiling hydrocarbon fractions including kerosene, gas oil, etc. In many cases, it is desirable to produce from kerosene a highly aromatic product useful as a solvent, and the catalyst of the present invention is readily applicable for this purpose. The catalyst of the present invention also may be useful for effecting hydrogenation reactions including the hydrogenation of unsaturated aliphatic hydrocarbons, such as monoolefins, diolefins, etc., to form the corresponding more saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding oxides, such as the oxidation of ethylene to ethylene oxide, propylene to propylene oxide, etc., oxidation of alcohols, ketones, etc. These and other oxidation reactions are well known in the art, and it is within the scope of the present invention to effect these reactions in the presence of the novel catalysts. Desulfurization of sulfur-containing charging stocks also may be effected by means of the present catalysts. Another particularly suitable process includes dehydrogenation of select charging stocks containing cyclohexane compounds and/or paraffinic hydrocarbons in order to produce aromatics and/or olefins, including di- and tri-olefins.

The following examples are introduced to illustrate further the novelty and utility of the present invention but not with the intention of unduly limiting the same.

*Example I*

Silica-alumina microspheres were prepared by commingling sulfuric acid with commercial water glass in proportions to form a sol having a pH within the range of 6.5 to 7. The sol was dispersed from a rotating disk in the form of droplets into a mineral oil bath at room temperature. The droplets descended through the oil, gelling to firm spherical particles, and continued to settle through a supporting column of water, wherefrom they were conveyed to subsequent washing and impregnation. The spheres were washed with water, and then were impregnated by commingling with aluminum sulfate solution and precipitating alumina by means of aqueous ammonia solution. The spheres were washed with water and dried at 320° F. for 10 hours. This catalyst contained 10.2% by weight of alumina on a dry basis.

When utilized for the cracking of a Mid-Continent gasoline of 31° A. P. I. gravity, at a temperature of 932° F., atmospheric pressure and a liquid hourly space velocity of 4, there was produced 4.7% by weight of gaseous products and 16.1% by weight of gasoline, making a total of 20.8% by weight of gas and gasoline.

*Example II*

Another batch of silica-alumina microspheres were prepared in substantially the same manner as described in Example I, but contained 11.8% by weight of alumina on a dry basis.

When used for the cracking of the Mid-Continent gas oil under the conditions set forth in Example I, there was produced 5.2% by weight of gaseous products and 17.7% by weight of gasoline, making a total of 22.9% by weight of gas and gasoline.

*Example III*

Approximately equal quantities of the silica-alumina microspheres prepared in accordance with Examples I and II were blended and were subjected to deactivation by treatment with steam at a temperature of 1500° F. for 6 hours.

When utilized for the cracking of the Mid-Continent gas oil under the conditions set forth in Example I, the deactivated catalyst produced 1.4% by weight of gaseous products and 9.3% by weight of gasoline, making a total of 10.7% of gas and gasoline.

It will be noted that the deactivated catalyst had a cracking activity of 10.7 which is slightly less than one-half of the average cracking activity of the blended silica microspheres prior to deactivation thereof.

*Example IV*

A portion of the deactivated silica-alumina microspheres prepared in accordance with Example III were utilized in the preparation of a catalyst containing 1.53% by weight of platinum. These catalysts were prepared by soaking the silica-alumina microspheres in a solution of chloroplatinic acid and subsequently heating to evaporate excess solution and reducing with hydrogen at a temperature of 572° F. for 4 hours.

The catalyst as prepared in the above manner was utilized for the reforming of a desulfurized Mid-Continent naphtha having an A. P. I. gravity at 60° F. of 63.9, an initial boiling point of 239° F., an end boiling point of 394° F., a sulfur content of about 0.0005% by weight, an aromatic content of 6%, an A. S. T. M. motor method octane number of 35.7 and a research method octane number of 38.9. The reforming was effected at an average catalyst temperature of about 675° F., pressure of 50 pounds per square inch, an 0.5 hourly liquid space velocity and a hydrogen to hydrocarbon molar ratio of about 2.9:1. 94% by volume of reformate was produced, the reformate containing 44.3% aromatics and having an A. S. T. M. motor method octane number of 60.7 and a research method octane number of 64. The 5% Engler distillation point of the charge was 254° F. and the 5% distillation point of the reformate was 244° F., thus showing that some cracking had occurred. It will be noted that even under these comparatively mild conditions the aromatic concentration was increased from 6% to 44.3% and the octane numbers increased at least 25 numbers.

*Example V*

Another run was made using the same catalyst and charging stock as described in Example IV. However, this run was made at a temperature of about 754° F., all other conditions being the same as described in Example IV. In this run the reformate yield amounted to 93.5% by volume. The reformate contained 48.4% aromatics and had an A. S. T. M. motor method octane number of 70.8 and a research method octane number of 77.5. The 5% distillation point of the reformate was 184° F. as compared to 254° F. of the naphtha charge. It will be noted that at the higher temperature the increase in octane number amounts to at least 35 numbers.

*Example VI*

In a run similar to that described in Example V but utilizing a temperature of 850° F., a superatmospheric pressure of 400 pounds per square inch and a space velocity of 2, the octane number of the final product will be about 75 A. S. T. M. motor method.

*Example VII*

A catalyst may be prepared to contain silica-magnesia and platinum. This catalyst is prepared by the general methods heretofore set forth and may contain 15% by weight of magnesia and 1% by weight of platinum. The silica-magnesia is deactivated prior to compositing the platinum therewith by heating the silica-magnesia at a temperature of 1800° F. in the absence of steam for a period of 20 hours. This catalyst may be used for the reforming of a naphtha, having an initial boiling point of about 250° F. and an end boiling point of 425° F., at a temperature of 900° F., a pressure of 500 pounds per square inch, a space velocity of 3 and a hydrogen to hydrocarbon molar ratio of 4:1.

*Example VIII*

A silica-thoria-palladium catalyst may be prepared in substantially the same manner as hereinbefore set forth to contain 20% thoria and 1.5% palladium by weight. This catalyst may be used for the treatment of a kerosene fraction, having an initial boiling point of about 375° F. and an end boiling point of about 572° F. at a temperature of 800° F., a pressure of 100 pounds per square inch, a space velocity of 1 and a hydrogen to hydrocarbon molar ratio of 3.5:1. The resultant product will be high in aromatic content and suitable for use as a solvent.

I claim as my invention:

1. A process for preparing a catalyst comprising heating a synthetic silica-alumina cracking component at a temperature of from about 900° to about 1800° F. in the presence of steam until the hydrocarbon cracking activity thereof is reduced below about 50% of the original activity, and compositing platinum therewith in an amount of from about 0.01% to about 2.5% by weight of the catalyst.

2. A process for preparing a catalyst comprising heating a synthetic silica-alumina cracking component at a temperature of from about 1500° to about 2000° F. until the hydrocarbon cracking activity thereof is reduced below about 50% of the original activity, and compositing platinum therewith in an amount of from about 0.01% to about 2.5% by weight of the catalyst.

3. A process for preparing a catalyst comprising heating a synthetic composite of silica and alumina at a temperature of from about 900° to about 1800° F. in the presence of steam until the hydrocarbon cracking activity thereof is reduced below about 75% of the original activity, and thereafter compositing therewith from about 0.01% to about 2.5% by weight of platinum.

References Cited in the file of this patent

UNITED STATES PATENTS

| | | |
|---|---|---|
| 2,390,556 | Ruthruff | Dec. 11, 1945 |
| 2,436,780 | Simpson | Feb. 24, 1948 |
| 2,474,198 | Lee et al. | June 21, 1949 |
| 2,478,916 | Haensel et al. | Aug. 16, 1949 |
| 2,550,531 | Ciapetta | Apr. 24, 1951 |